United States Patent [19]

Woolf

[11] Patent Number: 4,626,662
[45] Date of Patent: Dec. 2, 1986

[54] PROGRAMMABLE MULTI-FUNCTION FEEDBACK COOKING APPARATUS

[76] Inventor: Stephen R. Woolf, 6173 Coldbrook, Lakewood, Calif. 90713

[21] Appl. No.: 572,880

[22] Filed: Jan. 23, 1984

[51] Int. Cl.$^4$ ............................................. H05B 1/02
[52] U.S. Cl. .................................. 219/501; 219/506; 219/508; 219/442; 219/494; 340/870.17; 340/870.21; 340/825.06
[58] Field of Search ............... 219/10.55 B, 497, 494, 219/441, 442, 501, 490, 506, 491, 508; 307/117; 340/870.17, 870.07, 825.06, 870.21

[56] References Cited

U.S. PATENT DOCUMENTS

| | | | |
|---|---|---|---|
| 3,332,338 | 7/1967 | Wein | 99/330 |
| 3,800,091 | 3/1974 | Glidder et al. | 340/870.07 |
| 4,131,786 | 12/1978 | Cooper | 219/10.55 B |
| 4,225,776 | 9/1980 | Meisner et al. | 219/492 |
| 4,309,584 | 1/1982 | Terakami | 219/10.55 B |
| 4,367,387 | 1/1983 | Tachihara et al. | 210/10.55 B |
| 4,404,462 | 9/1983 | Murray | 219/497 |
| 4,471,354 | 9/1984 | Smith | 340/870.17 |

Primary Examiner—M. H. Paschall
Attorney, Agent, or Firm—Fulwider, Patton, Rieber, Lee & Utecht

[57] ABSTRACT

A programmable multi-function feedback cooking apparatus senses the temperature of food substance or a liquid cooking inside a vessel. The analog voltage produced by a temperature transducer is translated into a digital signal and is used by a central processing means which automatically adjusts the amount of heat energy that is applied by the heat source to the cooking food substance. In preferred embodiments, the generating means is a conventional gas or electric stove, oven or microwave. The programmable electronic feedback cooking apparatus comprises a temperature transducer which is placed inside a cooking vessel, an analog-to-digital converter, a microprocessor unit, and a control panel. The apparatus includes in a preferred embodiment, a remote control feature whereby the operator may program the electronic feedback cooking apparatus from a remote location, using a telephone.

8 Claims, 8 Drawing Figures

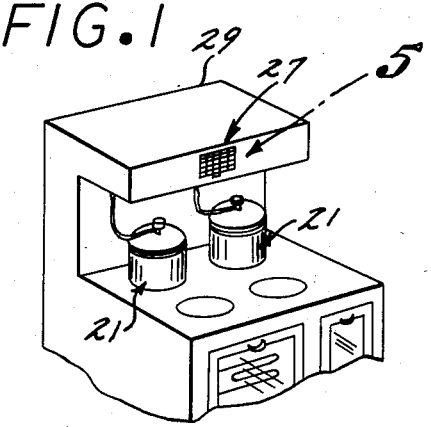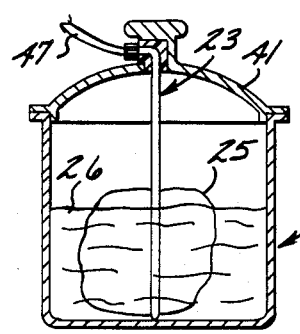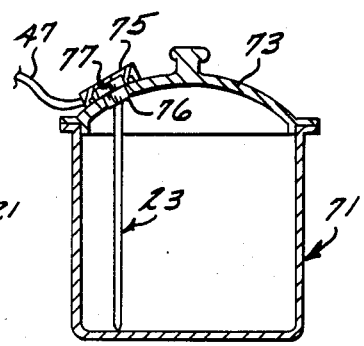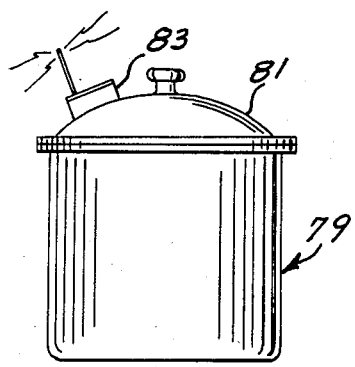
| 4" DIA. | 6" DIA. | 8" DIA. | 10" DIA. | OVEN 1 & 2 |
|---|---|---|---|---|
| AM | PM | DURATION | SLOW | RAPID |
| BOIL | SIMMER | FAN | TEMP | |
| PROGRAM | | MODERATE | | |
| 1 | 2 | 3 | 4 | 5 |
| 6 | 7 | 8 | 9 | 0 |
| | | OFF | | |
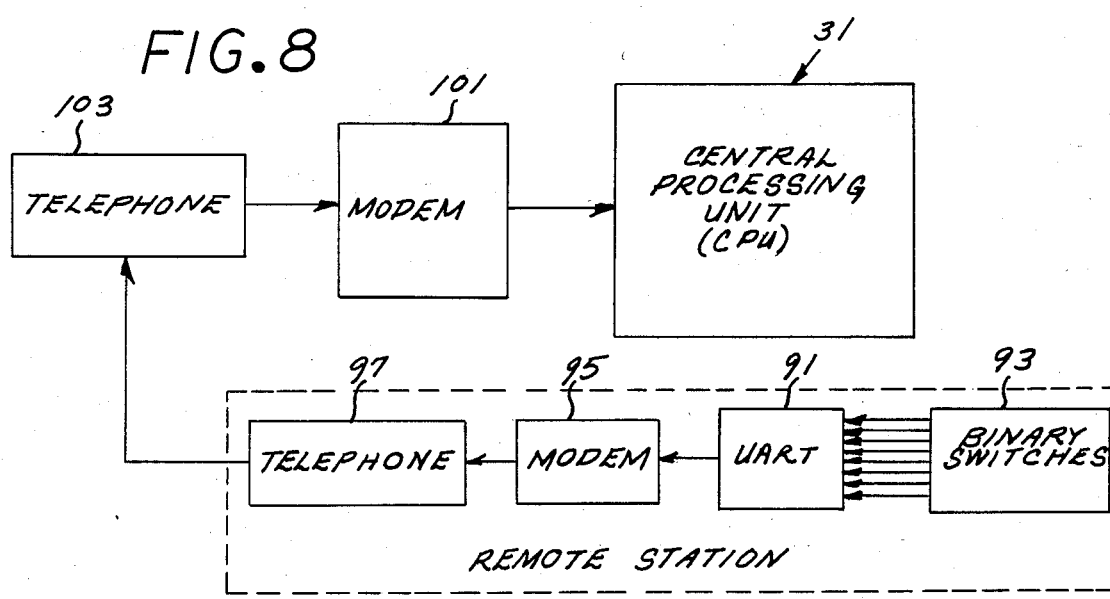

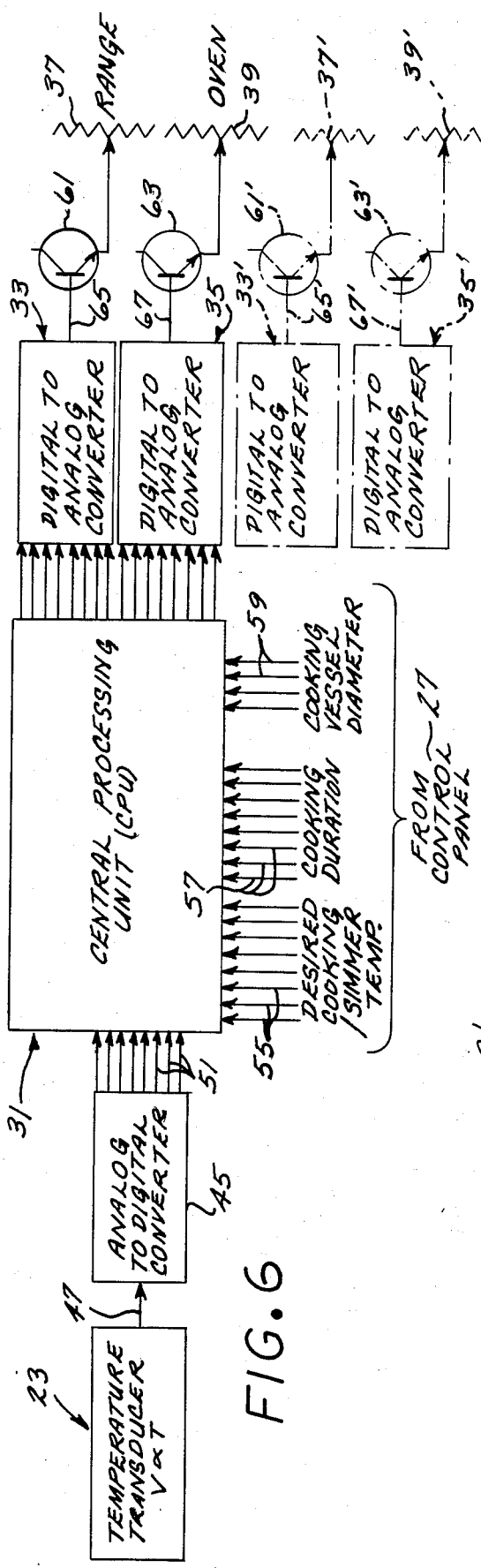
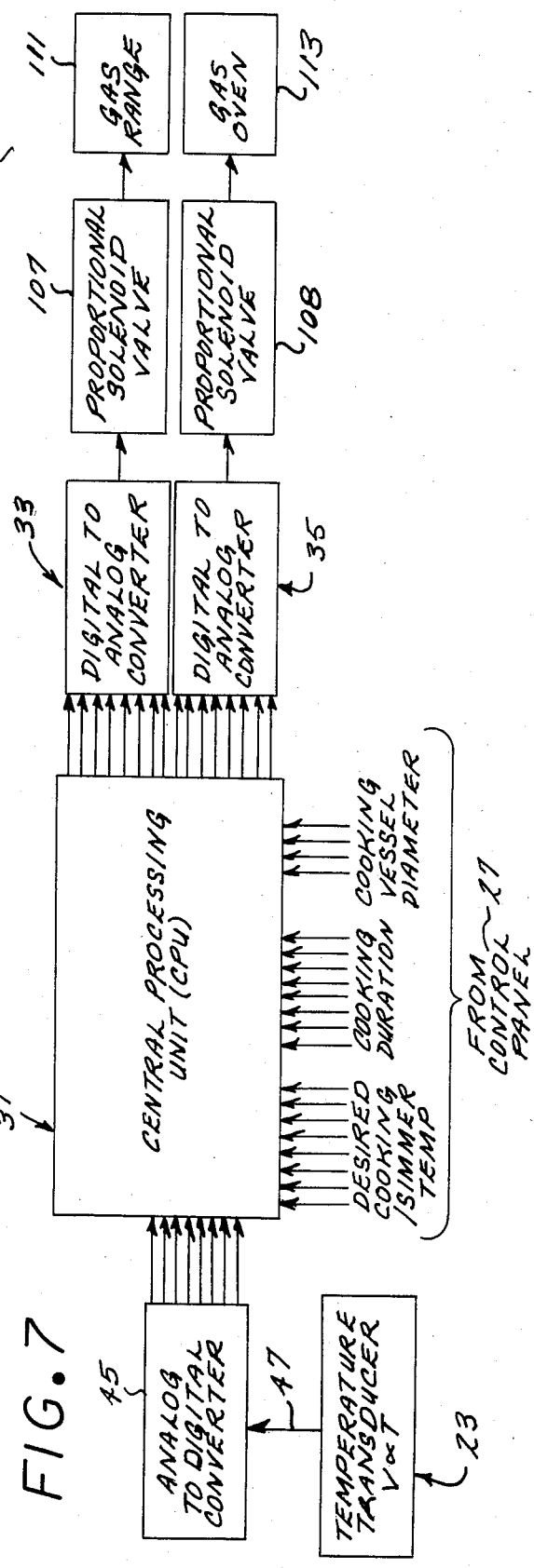
FIG. 6
FIG. 7

PROGRAMMABLE MULTI-FUNCTION FEEDBACK COOKING APPARATUS

BACKGROUND OF THE INVENTION

1. Field of the Invention:

The present invention relates in general, to an electronically controlled cooking apparatus and specifically to electronically controlled feedback cooking devices which use the feedback of actually sensed data during the cooking process to automatically and efficiently control the application of heat to the cooking food.

2. Description of the Prior Art:

Prior inventions provided for electronically controlled timing, primarily involving the activation of the magnitron of a microwave oven, as disclosed in, for example, Tachihara, U.S. Pat. No. 4,367,387 issued Jan. 4, 1983, which used microprocessors as a central controlling means with information such as cooking duration, cooking temperature and the amount of heat output desired entered manually by the operator. U.S. Pat. No. 4,309,584 to Terakami shows a keyboard control for a microwave oven which is intended to establish oven temperatures over selected periods of time, all without direct temperature feedback from the foodstuff. None of the prior devices provide for, and it is desirable to provide for, automatic adjustment of the amount of heat applied by the heat source based on direct sensing of the food temperature throughout the cooking process. The actual food temperature as sensed is then employed as feedback to the microprocessor control unit to correspondingly vary the amount of heat applied to the vessel.

Further, it is desirable to permit the remote control of the programmable multi-function feedback cooking across the room, or even from across town.

Moreover, none of the previous inventions provided for controlling the area over which heat is supplied to the bottom surface of the cooking vessel. These prior art devices thus suffer the shortcoming that heat from a heating element such as a flame or electrical heating element when emanating from an area greater than the area of the bottom of the cooking vessel is, in part, lost.

Prior inventions were very limited in controlling the amount of heat supplied by a heat source which was typically selected by the operator choosing "high", "medium" or "low". If the operator wished to raise the internal temperature of the cooking vessel or oven heat source as quickly as possible, and then reduce the heat and thereafter maintain the desired cooking temperature, operator was required to approximate when the heat should be reduced in effort to obtain the most efficient use of the heat generated.

Accordingly, the present invention performs such temperature adjustments automatically. The invention provides for the actual sensing of the food temperature and uses the information in a feedback circuit to automatically adjust the amount of heat being applied to the cooking food.

SUMMARY OF THE INVENTION

The present invention is characterized by a temperature transducer which produces an analog voltage proportional to the temperature it senses. An analog-to-digital converter translates the analog voltage into an 8-bit digital number which is read into a central processing means as input. The central processing means performs comparison and timing function using software algorithms to generate a digital signal output dictated by the temperature sensed as compared to control signals. The digital output is reconverted to an analog voltage which drives the solenoid valve for a gas heat generating means and the electric heating coils for an electrical heat generating means in proportion to the magnitude of the output of the central processing means.

The objects and advantages of the present invention will become apparent from the consideration of the following detailed descriptions when taken in conjunction with the accompanying drawings.

BRIEF DESCRIPTION OF THE DRAWINGS

FIG. 1 is a perspective view of a conventional cooking stove heating first and second preferred embodiments of the programmable multi-function feedback cooking apparatus of the present invention;

FIG. 2 is a view showing the cooking vessel with the temperature transducer placed inside;

FIG. 3 is a view showing the cooking vessel and temperature transducer with the transducer affixed to the cooking vessel by a detachable magnetic connector;

FIG. is a view showing the cooking vessel with remote control;

FIG. 5 is a view of the system control panel on the face of the heat source as shown in FIG. 1;

FIG. 6 is a block diagram of the electronic circuit of the present invention;

FIG. 7 is a schematic diagram of the circuit of one embodiment of the present invention;

FIG. 8 is a schematic diagram of a preferred embodiment with remote control of the programmable multi-function feedback cooking apparatus.

DESCRIPTION OF THE PREFERRED EMBODIMENT

The multi-function feedback cooking apparatus of the present invention includes, generally, at least one cooking vessel 21 having mounted therein a elongated transducer 23 for disposition in direct heat exchange relationship with foodstuffs 25 in the vessel or with fluid 26 in which such heat stuffs is, at least, partially immersed. Referring to FIGS. 1 an 6, an actuator, which may be in the form of a control panel, generally designated 27, is mounted on a stove 29 with which the vessel 21 is to be employed and is connected with a central processing unit (CPU), generally designated 31, which is also coupled with the transducer and is operative to generate a signal proportional to the magnitude of difference between the temperature sensed by the transducer 23 and the desired temperature fed into the unit from the control panel 27 to thereby generate an output signal which is fed to one or more digital-to-analog converters 33 and 35 operative to control energy to the respective range and oven heating units 37 and 39.

Referring to FIGS. 1 and 2, the transducer 23 may be mounted on one end directly in the top 41 of the vessel 21 to be disposed vertically in the center of the vessel when such top is in its closing position on the vessel. In the embodiment shown in FIG. 2, the transducer 23 is connected directly to an analog-to-digital converter 45 mounted in the framework of the range 29 by means of an insulated electrical lead 47. The converter 45 is operative in response to the magnitude of voltage received from the tranducer 23 to generate discrete electrical signals which depend on the magnitude of the voltage generated. The converter 45 is connected with the processor 31 by means of parallel electrical leads 51 which connect with separate imput terminals. The processor 31 incorporates a microprocessor which acts as a comparator for comparing the digital signal from the converter with the actuating signal generating by actuating a selected control button on the control panel 27 as described hereinafter. The software of the microprocessor may be operative to generate a digital signal in accordance for example with the incorporated software program characterized by the following formula, although it should be appreciated that any type of equation or relationship may be utilized:

$$Y = ax + b,$$

where a & b are selected constants and x represents the difference between the input signal from the converter 45 and the temperature input signal from the control panel 27.

The processor incorporates circuitry to enable the heat from the heating units 37 and 39 to be maintained at an elevated temperature during initial heating of the vessel and contents thereof and to then enable the magnitude of heat generated to be reduced to thus merely maintain a desired temperature, as for instance a "simmering" mode. This is accomplished by means of software incorporated in the processor whereby the heat generated is determined by the linear equation:

$$Z = ct + d,$$

wherein Z is the amount of heat, t is the differential in temperature of the foodstuff as actually sensed and the desired temperature entered from the control panel 27. c & d are constants. The software of the processor is selected such that when the differential t becomes O, the amount of heat, Z, is equal to the constant d which has been preselected to be of such magnitude as to generate a simmer signal to be employed to reduce the heat to the heating element 37 sufficiently to maintain the foodstuff in a simmering mode. It will be equally apparent that such processor may be programmed to be further operative to actually discontinue the heat to the heating element 37.

Referring to FIGS. 1, 5, 6 and 7, the control panel 27 may be in the form of a push button panel having various legends thereon to indicate the parameter to be selected by depression of each respective button. For instance, ten separate digits are shown which may be depressed in the required sequence to designate a particular temperature. For instance, in the preferred embodiment, the control apparatus is of a well known circuitry to enable the time of the day to be entered, along with the designation "a.m." or "p.m." along with the number of hours the foodstuff is to remain at the temperature selected i.e. "Duration." Other functions to which the apparatus of the present invention is not limited are also incorporated in the panel 27. The electrical signal generated by the curcuitry controlled by actuation panel 27 is fed into the processor by means of leads 55 for comparison with the input from the convert 45. The cooking duration signal is received from the leads 57.

As a option, in the preferred embodiment, a separate control is provided for entering the diameter of the cooking vessel 21 in which the transducer 23 is being employed. While the circuitry for attaining variable cooking area may take many different forms, such as parallel switches for different diameter burners, the system shown provides for control through the CPU 31. The diameter of such vessel is entered into the processor through leads 59 and such processor is operative to generate distinct heating unit area control signals which are communicated through the respective converters 33 and 35 to respective transistors 61 and 63 which control the diameter of flame applied to the bottom of the vessel 21 or diameter of other heating unit actuated for applying heat to such vessel. The output form the converters 33 and 35 is communicated through selected leads dictated by the CPU 31 to selected parallel connected transistors 61 61' etc. and 63 63' etc., respectively to energize the respective heating elements 37 or 37' and 39 or 39' of the selected heating area.

The processor 31 is operative to convert the differential between the input from the converter 45 and from the control panel 27 to digital output signal fed to respective digital-to-analog converters 33 and 35.

The digital-to-analog converters 33, 35, 33', and 35' are operative to generate analog signals corresponding with the particular processor output signal received from the processor 31 and are coupled with the respective bases of respective transistors 61 and 63 by means of respective leads 65 or 65' and 67 or 67'. The collector to emitter circuits of the respective transistor 61 and 61' etc. and 63 and 63' etc. are connected from the electrical supply circuit to the respective heating units 37 and 37' and 39 and 39' of the respective range and oven to thereby enable control of the energy thereto as dictated by varying the signal through the leads 65 and 67.

In operation, the programmable multi-function feedback cooking apparatus shown in FIGS. 1, 2, 5 and 6 may be utilized in the efficient automatic cooking of foodstuff, such as vegetables, roasts, fish, meat, poultry and the like. For instance, for the cooking of a pot roast 25, the processor 31 may be programmed via the control panel 27 for efficient and rapid heating of the particular diameter of vessel 21 selected to rapidly elevate the temperature of the pot roast 25 to optimum cooking temperature, to automatically hold such pot roast at that cooking temperature and, if desired, lower the temperature of the pot roast 25 to a reduced, or simmer temperature, until such time as it is to be removed from the vessel for the planned meal. It will be appreciated that the same general procedure may be followed for the oven heating element 39 or 39' for simultaneous roasting of a turkey or the like at the specific optimum temperatures desired.

The vessel 21 is then placed on and centered over the circular heating units, 37 prime etc., the roast 25 placed in position and any desired fluid 26 or vegetable or other ingredients added. The top 41 is then moved into position with the transducer 23 piercing the roast 25 to obtain good heat exchange relationship with the central portion thereof.

Assuming the vessel 21 is 10 inches in diameter and the roast 25 is to be cooked at 200 degrees F. for 2 hours or until the internal roast temperature is 185 degrees and then held at 100 degrees F. until removal, the control panel will be actuated as follows. The 10 inch diameter button is depressed and the buttons for the numerals 2-0-0 depressed, followed by depression of the button marked "duration". The buttons marked with the numerals 3-7-5 are depressed followed by depression of the "temp" button. In addition, the buttons marked 1-8-5 are depressed followed by the "simmer" button. Finally, the buttons marked with the numerals 1-0-0 are then depressed, followed by depression of the button marked "slow".

Actuation of the 10 inch diameter control button enters a signal in the processor 31 causing such processor to emit a signal to the converter 33 which is communicated to the base of the transistor 61 which then emits current to the 10 inch diameter heating unit 37 at a magnitude to be determined by the processor 31 in accordance with the remainder of the program. It will be appreciated that the transducer 23 initially senses the relatively cool temperature of the roast 25, thus generating a signal entered in to the converter 45 for introduction to the processor 31 which represents such relatively low temperature and is compared with the 200 degree signal received from the circuitry operated by the control panel 27 thus representing a relatively large temperature differential thereby generating a corresponding signal fed into the converter 33 to drive the transistor 61 in a manner which will afford high current through the 10 inch diameter heating element 37.

As the temperature of the roast 25 increases and approaches the target temperature 200 degrees, the differential signal generated in the processor 31 will so indicate thus feeding corresponding signals into the converter 33 which will serve to drive the transistor 61 in a direction to gradually reduce the current to the 10 inch diameter heating element 37 thereby reducing the heat input to the vessel 21 and, accordingly, to the roast 25. When the 200 degree temperature is achieved, the current through the heating element 37 will be maintained at a level sufficient to maintain a desired 200 degree temperature for the full 2 hour cooking period previously selected. Thereafter, the processor 31 will operate to reduce the reference actuation temperature to that corresponding with the 100 degree level selected thereby generating a signal fed through the converter 33 to the transistor 61 reduce the current through the heating unit 37. The current through such heating unit will be thus maintained at a level sufficient to hold the desired 200 degree temperature for the roast 25 until such time as the off button of the panel 27 is actuated.

As a optional feature, the processor 31 is programmed to sense signals from the converter 45 indicative of an excessively high temperature sensed by the transducer 23 which would indicate that the foodstuff or fluid in which it is contained has deteriorated or evaporated to the point where further heating would not be required. In that instance, the processor 31 will operate to emit a signal resulting in turning off the current to the heating unit 37.

Referring to the vessel, generally designated 71 and shown in FIG. 3, the cover 73 thereof is formed with a through bore which has a mounting ring 75 friction fit therein for mounting of the tranducer 23. Removably attached to the upper surface of the vessel top 73 is a cap 75 worn by a permanent magnet and mounting centrally therein a contact 77 which is connected on its opposite end with the converter 45. Consequently, the magnetic cap 75 may be employed to mount the contact 77 in electrical contact with the transducer 23 of any one of a number of different vessels.

The vessel, generally designated 79 shown in FIG. 4 incorporates a cover 81 having mounted on the top surface thereof in alignment with the top end of the transducer (not shown), an electrical transmitter 83 which is operative to transmit radio frequency signals idicative of the temperature of the foodstuffs contained in the vessel. These signals may be picked up by a receiver incorporated in an analog-to-digital converter similar to the converter 45.

The remote control programmable multi-function feedback cooking apparatus shown in FIG. 8 incorporates a universal asynchronous receiver transmitter (UART), generally designated 91 which receives its imput from a panel of binary switches 93 corresponding with the desired programmable functions to be fed into the processor 31. The UART unit converts the parallel signals from the binary switches to serial signals which are fed into a modem unit 93 which then converts those serial signals into audio signals to be fed into the mouth piece of a conventional telephone 97. Connected to the input of the processor 31 via a modem unit 101, is a receiving telephone 103.

Consequently, when the operator desires to actuate the processor 31 from a remote location, he need merely dial his home telephone number and actuate the binary switches to input the desired information into the UART for transmission through the modem to the telephone 97. The signal is then transmitted to the home telephone 103 for conversion back through the modem into electric signals for entry into the processor 31 which is then operative to control converter similar to the converters 33 and 35 of FIG. 6. It will be appreciated that the panel 27 will typically have been preprogrammed prior to departure by the operator and that the system may be actuated from the remote location.

The programmable multi-function feedback cooking apparatus shown in FIG. 7 is similar to that shown in FIG. 6 except that it is intended for use with a gas range and oven. Consequently, the output from the converters 33 and 35 is employed to control respective range and oven proportional solenoid valves 107 and 108 which control the rate of gas flow to the gas burners 111 and 113 of the range and oven, respectively.

From the foregoing, it will be apparent that the programmable multi-function feedback cooking apparatus of the present invention provides an economical, efficient and automatically controlled means for cooking foodstuffs at a specific desired temperature without dissipation of excess heat as is typical in prior art cooking apparatus.

I claim:
1. Programmable feedback cooking apparatus for controlling the temperature of foodstuff in at least one vessel adapted for being heated by a selected heat generating means and comprising:

temperature transducing means mounted in the vessel to be removably disposed in direct heat exchange relationships with said foodstuff or fluid in said vessel for generating a first electrical input signal proportional to the temperature of the foodstuff;

analog-to-digital converter means coupled with saud transducer for receiving said first electrical input signal and translating it into a digital input signal corresponding with the magnitude of said first electrical signal;

actuating means including a plurality of switching means selectively actuatable to generate selected temperature signals corresponding to a predetermined food temperature;

central processing means, including programming means, coupled to said converter means and responsive to the difference between said digital input signals and said selected temperature signals, said programming means generating corresponding digital output signals in accordance with a selected mathematical relationship between said difference between said digital input signal and said selected temperature signals, and said digital output signal;

digital-to-analog converter means coupled with said processing means and responsive to said digital output signal to generate a corresponding analog signal; and proportional control means coupled with said converter means, the heat generating means and said central processing means and responsive to the magnitude of said analog signal to proportionally vary the magnitude of energy introduced by said heat generating means to thereby control the heat applied to said vessel in accordance with said mathematical relationship based on the difference between the temperature selected on said actuating means and the actual temperature of said foodstuff or fluid as sensed by said transducer.

2. A programmable multi-function feedback cooking apparatus in accordance with claim 1 and including:
remote control means for activating said actuating means.

3. A programmable multi-function feedback cooking apparatus in accordance with claim 1 wherein:
said heat generating means includes a gas burner; and
said control means comprises a proportional solenoid valve for controlling the flow of gas to said burner.

4. A programmable multi-function feedback cooking apparatus in accordance with claim 1 wherein:
said heat generating means comprises electric heating elements; and
said control means comprises current control means to control current to said electric heating elements.

5. A programmable multi-function feedback cooking apparatus in accordance with claim 2 wherein:
said remote control means includes a plurality of telephones; and
a plurality of modulator-demodular means.

6. A programmable multi-function feedback cooking apparatus in accordance with claim 2 wherein said remote control means comprises:
transmitting means mounted on said cooking vessel, coupled with said tranducer means, and responsive to the magnitude of said electrical signal to generate and transmit a corresponding temperature signal; and
receiver means coupled with said central processing means and responsive to said temperature signal generating said digital input signal.

7. A programmable multi-function feedback cooking apparatus in accordance with claim 5 wherein:
said actuating means includes a plurality of telephones;
switching means for generating the selected imput signals;
modulator-demodulator means for encoding the selected input signal for transmission over telephone lines;
a universal synchronous receiving and transmitting means for receiving the selected input signals from said switching means; and
a modulator-demodulator means for decoding said selected input signal for reading into said central processing means as input.

8. A programmable multi-function feedback cooking apparatus in accordance with claim 1 and including:
said heat generating means includes heat area control means for varying the area over which is generated; and
said control means includes manually operable control elements connected with said heat area control means and selectively operable to vary said area.

* * * * *